May 24, 1949.　　　　　　　C. E. ELLIS　　　　　　2,470,767
POLYPHASE ALTERNATING CURRENT DYNAMO
Filed Dec. 6, 1945　　　　　　　　　　　　　　5 Sheets-Sheet 1

INVENTOR:
CHARLES E. ELLIS
BY
ATTORNEYS

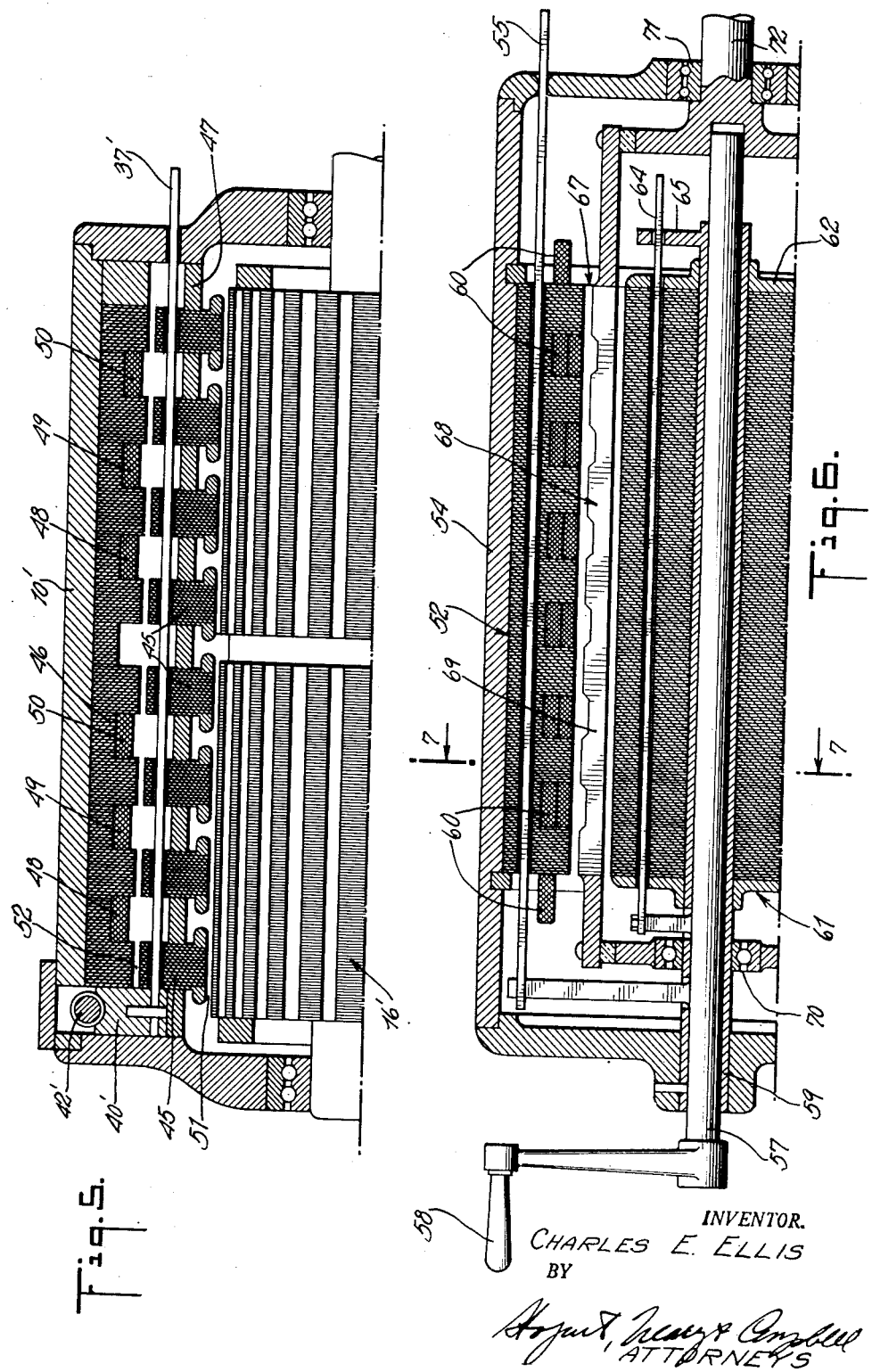

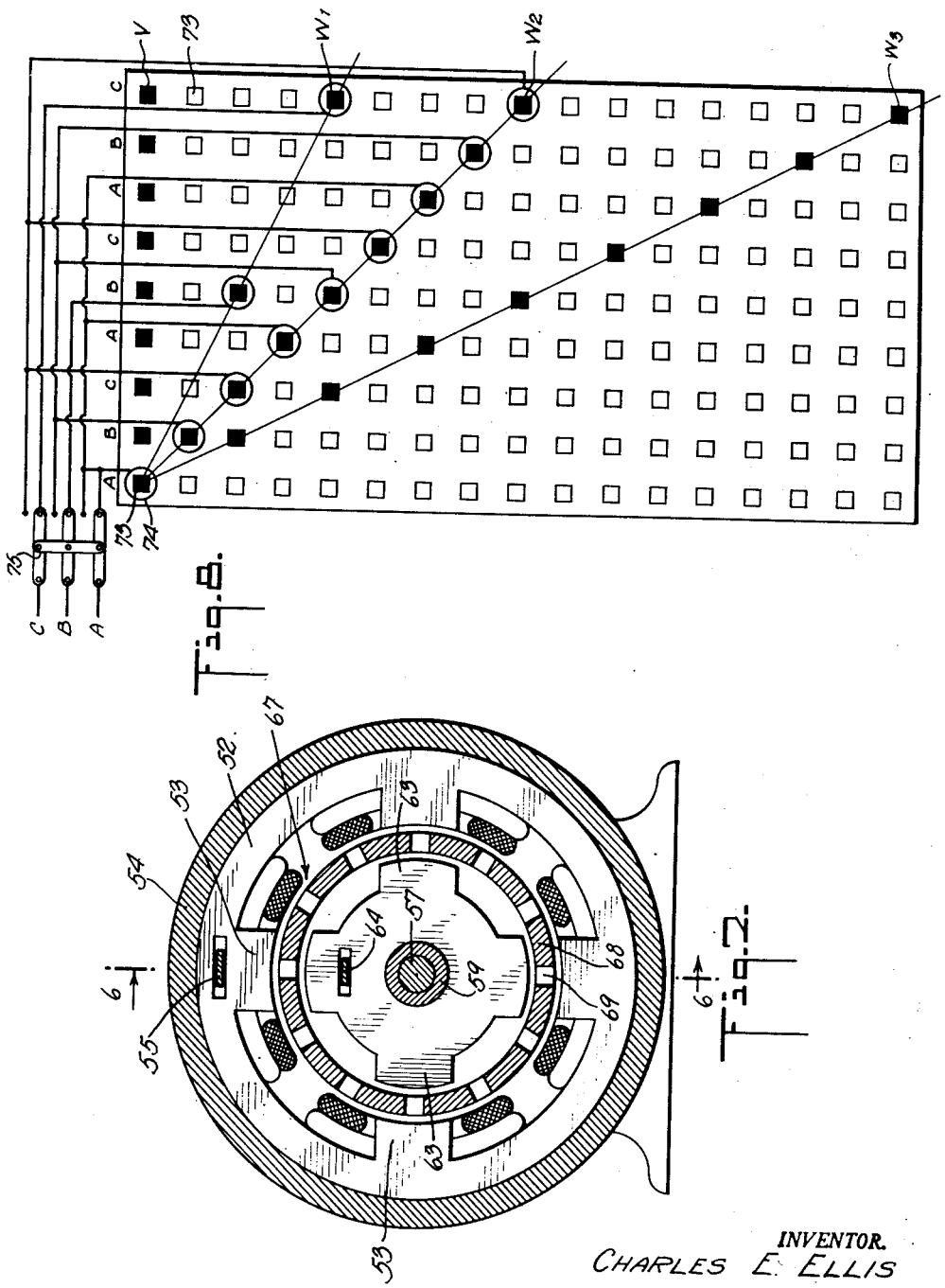

Patented May 24, 1949

2,470,767

UNITED STATES PATENT OFFICE 2,470,767

POLYPHASE ALTERNATING CURRENT DYNAMO

Charles E. Ellis, Mahwah, N. J.

Application December 6, 1945, Serial No. 633,151

16 Claims. (Cl. 318—243)

This invention relates to dynamo-electric machines and has particular reference to a polyphase alternating current dynamo usable alternatively as a motor or as a generator.

The invention is based on the novel principle that movement of a flux concentration in a straight line along a series of linearly disposed stator pole faces and associated windings each connected to a corresponding phase of polyphase alternating current source, with said pole faces skewed with respect to a movable elongated non-magnetic conductor, either in the form of a bar or a group of insulated wires, causes the latter to move parallel to itself at an angle to its length as a motor. Variation in the degree of relative skew between the stator pole faces and conductor varies the speed of movement of the conductor. Conversely, if the conductor is moved relatively to the row of stator pole faces at constant speed above synchronous speed and the windings are connected to a variable frequency exciting source, the apparatus becomes a polyphase induction generator, wherein the rate of movement of the flux depends upon the degree of relative skew between the stator pole faces and the conductors independently of conductor speed.

In one embodiment of the polyphase alternating current dynamo of this invention, the stator is composed of a plurality of spaced sets of lamination rings having pole-forming projections circularly spaced on their inner peripheries so that when stacked the projections form axial bars, of which there may be four, for example, whose inner faces serve as pole faces. These lamination rings are divided into axial groups by suitable spacers, numbering multiples of the desired phases, such as six groups for a three-phase apparatus and each stator pole bar is thus divided into the aforementioned linearly disposed pole faces. The stator laminations are mounted for progressive circular displacement so that the pole bars and their faces become skewed relatively to the axial plane to the desired degree. Corresponding windings for each pole group are connected according to the corresponding current phase, such as three phase Y, delta, or the like. The rotor is composed of circularly arranged spaced conductors, either in the form of bars or windings, having their long axes either skewed or parallel to the axial plane and mounted in a magnetic core rotating within the circle defined by the pole faces of the stator. If operated as a motor, the windings are energized from a suitable source of three phase current, and when the stator pole faces are axially skewed in the manner described, the rotor revolves at a speed determined by and variable according to the relative angle of stator pole skew. If operated as an induction generator, the rotor is driven above synchronous speed with the stator windings connected to a variable frequency source, whereby a three phase current is induced in the rotor whose flux rate depends upon the degree of relative skew of the pole faces.

In a modification of this embodiment, the axially spaced sets of skewable stator lamination rings are interposed between and separated by radial air gaps from the rotor and from corresponding axially-spaced stationary annular rings between which the three-phase ring-shaped coils are inserted. In this modification the flux traverses the air gaps radially as it moves from pole to pole axially along each row of pole faces. Inasmuch as one coil thus serves each circular row of poles, fewer coils are required than the foregoing embodiment.

In a second embodiment, a tubular shell type of rotor revolves in the space between the pole faces of telescoped inner and outer stators, the latter having the exciting coils. The laminations constituting the poles of these stators are skewable to vary the relative skew angle between them, whereby the speed of rotation of the shell rotor may be regulated at will within wide limits.

In another modification, applicable to either of the aforementioned embodiments, the skewing effect is obtained electrically instead of mechanically, by arranging stator poles and associated windings in a regular coordinate pattern and energizing those windings which describe a series diagonal to the axial plane. By selective energization of such series arranged at different angles to the axial plane, the effective skew angle may be varied at will to secure the effects described.

It will be seen that a very simple, rugged and flexible dynamo for either polyphase motor or generator use is provided by this invention, whereby the speed of an induction motor may be varied at will within wide limits, and the effective flux rate of a polyphase output induction generator may likewise be varied at will within wide limits.

For a more complete understanding of the invention, reference may be had to the accompanying drawings, in which:

Fig. 5 is a half axial section through a modification of the embodiment of the invention illustrated by Figs. 1 and 2;

Fig. 6 is an axial section through another embodiment of the invention as seen along the line 6—6 of Fig. 7.

Fig. 7 is a transverse section therethrough as seen along the line 7—7 of Fig. 6; and Fig. 8 is a development of an electrically skewable series of poles.

Figure 1:
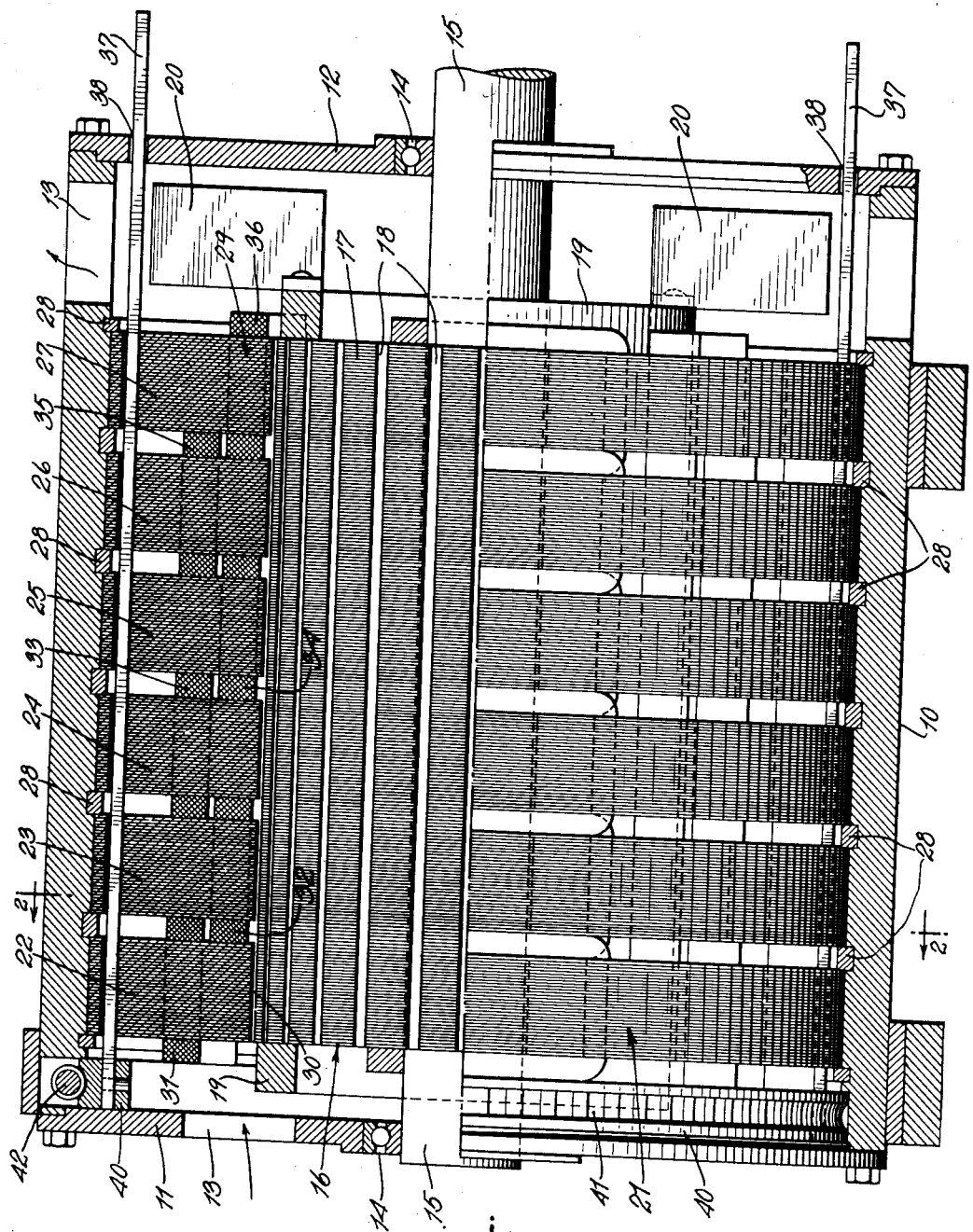
Figure 1 is a side elevation partly in section through one embodiment of the invention as seen along the line 1—1 of Fig. 2.
Figure 2:
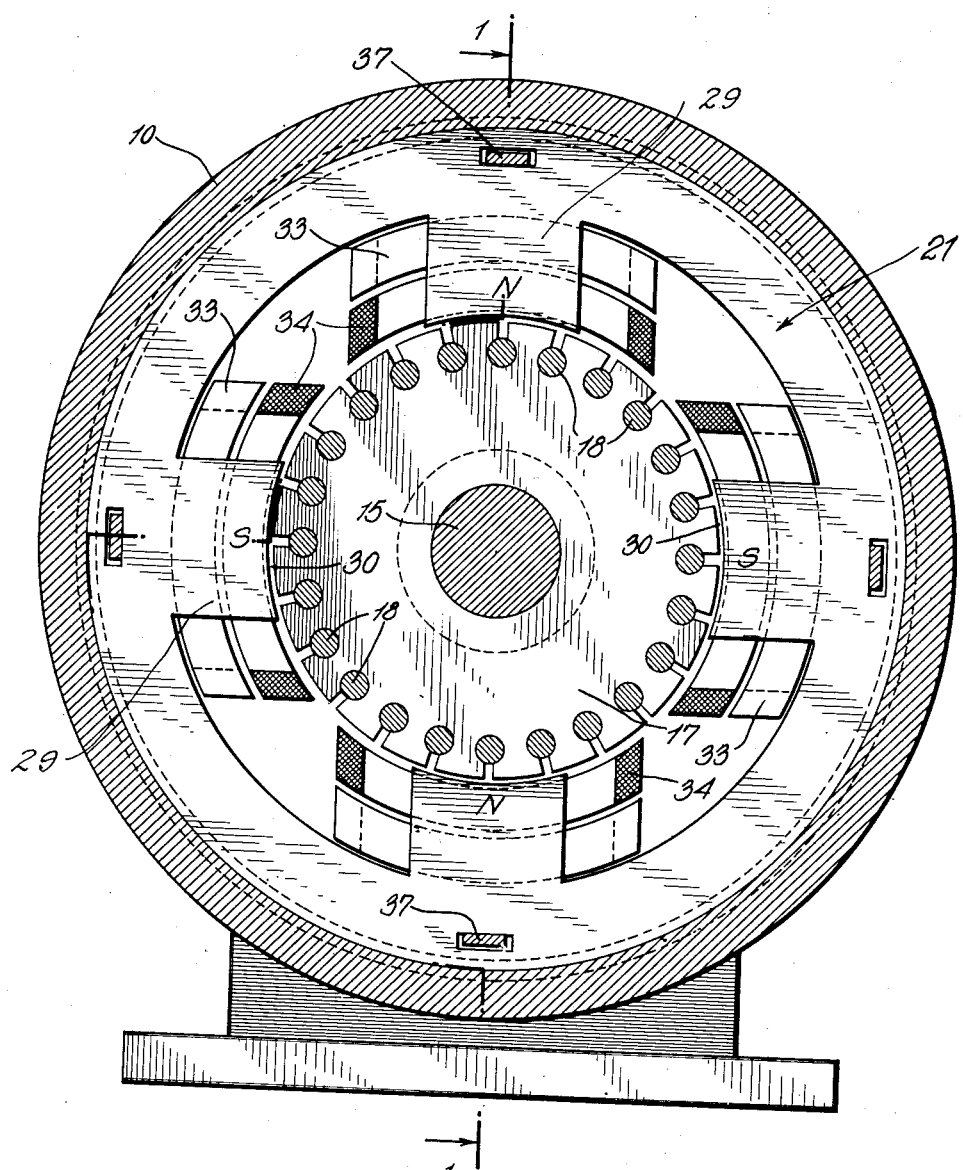
Fig. 2 is a transverse section therethrough as seen along the line 2—2 of Fig. 1.

Referring to Figs. 1 and 2 of the drawings, numeral 10 designates a stationary frame of generally tubular shape having end plates 11 and 12 provided with ventilating openings 13 and containing bearings 14 in which is journalled the shaft 15 of rotor 16.

Rotor 16 comprises a core 17 of laminations of iron or other magnetic material, each having a plurality of registering peripheral notches forming spaced slots in which elongated bars 18 of non-magnetic conducting material, such as copper, are inserted. The opposite ends of the bars 18 are connected together by rings 19, thus forming a squirrel cage rotor construction having, say, twenty-four conducting bars arranged parallel to the plane of the axis of rotation. One end of the rotor 16 may carry the fan blades 20 for drawing cooling air into openings 13 and through the interior of housing 10, or a separate continuously-running fan may be supplied.

Although a squirrel cage rotor shown is preferable in many instances, the equivalent wound rotor may be used with equal facility. In that case, the rotor bars 18 and ends rings 19 are replaced by the usual three groups of insulated copper wires embedded in the slots with their terminals either short-circuited or connected through three slip rings to an external Y-connected rheostat, as in conventional induction motor practice. Inasmuch as the wound rotor is conventional it need not be illustrated, the squirrel cage rotor shown being sufficient for illustrating the invention. In view of the equivalency of squirrel cage bars and the multiple strand conductors of the wound rotor, the term "conductor" as used herein intended to comprehend both within its scope. Whether of squirrel cage or wound construction, the bars 18 or equivalent windings may be inclined or skewed to the axial plane instead of being parallel thereto, as shown, whereby there is a permanent relative skew between them and the stator poles 29 to secure the effects described.

Stator 21 is composed of a stack of loose, ring-shaped laminations of iron, soft steel, or other suitable magnetic material divided into six axial groups 22—27 by spacers 28, which may be snap rings sprung into corresponding slots in the inner surface of housing 10. Each stator lamination is provided with a plurality of spaced radial projections, say, four, at its inner periphery, which, when axially aligned as shown, constitute four linear rows 29 of poles whose faces are arcuate and separated from the surface of rotor 16 by a narrow air gap 30, as shown.

Figure 3:
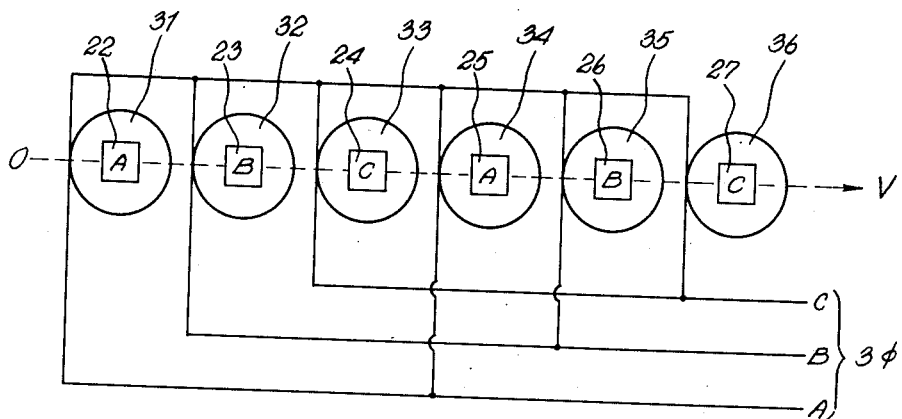
Fig. 3 is a diagram illustrating the mode of connecting the stator poles of the apparatus to a source of three phase alternating current.

Mounted on each stator pole group 22—27, are corresponding windings 31—36, respectively, alternate windings being lapped and staggered as shown to conserve space. Assuming that the apparatus is intended for three-phase Y operation, as a motor, each coil is connected to a corresponding current phase, as shown in Fig. 3. Thus, windings 31 and 34 are connected to phase A, windings 32 and 35 to phase B, and windings 33 and 36 to phase C. Alternatively the windings may be delta or star connected, or otherwise according to the particular polyphase operation required.

As shown in the drawings, the laminations constituting the stator 21 are arranged with the pole rows 29 lying in axial planes, but during operation these pole rows are skewed out of the axial plane. This skewing action is preferably effected by sliding the loose laminations circularly upon the inner surface of the housing 10, so that successive laminations are progressively displaced from one end to the other of the stator. A preferred means for displacing the stator laminations in this manner is by one or more twistable but laterally stiff slats 37 passing through registering slots in the laminations and anchored at one end, as by insertion in a slot 38 in end plate 12, and movable at the other end, as by pivoting on a large rotatable ring 40. Ring 40 is journalled in the housing 10 and its outer surface is provided with a worm sector 41 engaged by worm 42 journalled on the housing 10, so as to rotate the ring 40 the proper degree to obtain the desired angle of skew of the faces of stator pole rows 29. As shown in Fig. 2, the coils are enlarged transversely to accommodate the skewing of the corrsponding poles.

Figure 4:
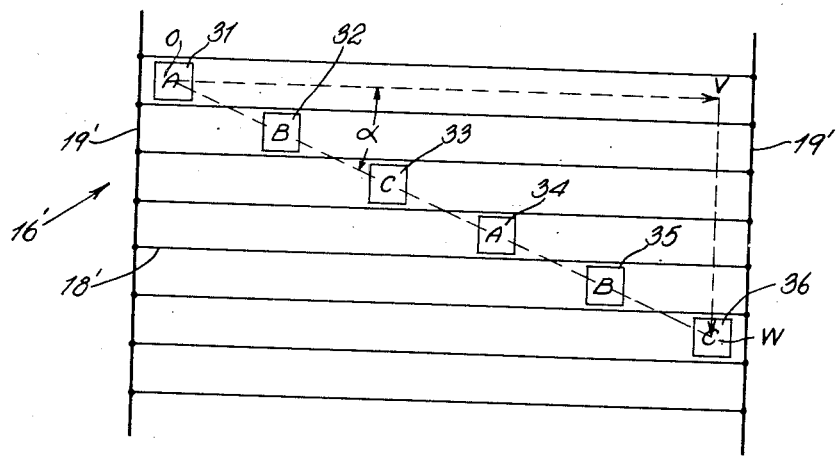
Fig. 4 is a diagram illustrating the principle of the invention.

In operation of the apparatus of this invention as a motor, energization of the stator windings 31—36 from a source of three phase alternating current, indicated in Fig. 3, causes a concentration of flux, or flux "bundle," to move along the face of each stator pole row 29 in an axial direction from one pole face to another. For example, the movement may be from left to right along the line 0V, i. e. from A to C, Fig. 3. If the alternating current has the usual sinusoidal wave form, the total of the flux emanating from the pole faces of such a three-phase field arrangement is a constant and equals the algebraic sum of the instantaneous fluxes, which is zero, so that in the unskewed condition, where no flux linkages occur, no currents are induced in the rotor. However, if the pole faces are skewed or angularly displaced from position 0V through the angle a to position 0W, as shown in Fig. 4, the flux concentration or flux bundle, moves diagonally downwardly to the right from 0 to W, as indicated by the arrow 0W. This skewing is effected in the apparatus of Figs. 1 and 2 by rotating worm wheel or ring 41 by means of worm 42 so as to deflect slats 37 and thus displace the stator laminations in the manner described.

The diagonal path 0W of the flux bundle along the faces of poles 31—36 represents the hypotenuse of the right vector triangle 0VW, whereas vector 0V represents the component of its movement along the original or unskewed path in the axial plane, and vector VW represents the component of its movement normal to the axial plane, at right angles to the original or unskewed movement. If the flux bundle is caused to penetrate a grid 16' composed of conductors 18' parallel to 0V, connected by end bars 19', of non-magnetic properties, currents will be induced in the grid conductors 18' by the flux bundle only to the extent of its component of movement VW at right angles to OV.

The currents induced in the grid conductors 18' set up magnetic fields which tend to oppose the VW component of motion of the flux bundle which creates them. This induced magnetic field distorts the normal flux distribution of the flux bundle with reference to the successive stationary magnetic field poles 31—36 and at the same time exerts a physical force on the grid conductors 18' which tends to move the grid 16' in the direction VW. Considering the grid 16' as the squirrel cage rotor 16 made up of the axial conductors 18, the component of the spiral motion of the flux bundle following skewed poles 31—36, equivalent to VW and normal to the axis, causes the rotor 16 to revolve.

Considering the frequency of the three-phase input alternating current to be constant, and the vector triangle of Fig. 4 to be a velocity diagram, it is evident that the length of the vector VW, and hence the speed of movement of the component normal to the axis, depends upon the magnitude of the angle of skew, α. Thus, the rate of movement of grid 16', or the speed of rotation of rotor 16, can be varied at will, within practical mechanical limits, by adjusting the angle of displacement of skewing slats 37 by means of worm 42. In this way a variable speed polyphase alternating current induction motor is provided by this invention.

Whereas the slip of the conventional induction motor is usually indicated by the ratio of the difference between the flux speed and the rotor speed to the flux speed, the slip in the motor of the present invention is approximately proportional to the torque it is delivering at any setting of stator skew.

By skewing the poles 31—36 in the opposite direction reverse rotation under the same operating conditions is obtained without any other change.

If the load overhauls the motor, at any speed setting, it automatically becomes a generator feeding current into the constant frequency supply line.

This leads to the alternative use of the apparatus of this invention as a variable flux induction generator, by connecting its windings 31—36 to a variable frequency source of exciting power and driving the rotor 16 above synchronous speed. The rate of the relative movement of the flux induced in the rotor conductors 18 depends upon the angle of skew, α, of the stator poles. Thus, increase in the skew angle α is tantamount to increase in the speed of rotation of rotor 16, because the rate of relative movement of the flux is increased without any increase in the physical speed of the rotor 16. Accordingly, effective speed may be varied at will within wide limits without requiring change in the speed of the prime mover or other source of generator drive. Similarly, when used as a motor the angle of relative skew between the stator poles and rotor bars or windings secures supersynchronous speeds, a feature of the invention not obtainable with ordinary induction motors. In that case, the bars or windings of the rotor are permanently or variably skewed to the axial plane, as described, and that feature is applicable to each of the forms or modifications of the invention disclosed herein.

Fig. 5 illustrates in half axial section a modification of the dynamo described in connection with the preceding figures of the drawings, and has an advantage of material reduction in the number of exciting coils or windings. In Fig. 5, the same rotor 16' of Fig. 1 is shown, except that it is a double rotor. The skewable stator poles 45 are interposed between the rotor and a tubular stationary member 46 secured to the dynamo frame 10'. The stator bars 45 are lamination rings relatively rotatable on each other as skew worm ring 40' is rotated by worm 42' to twist non-magnetic slat 37' as previously described. The stator bars 45 are held between non-magnetic non-conducting skew guides 47 suitably secured to the frame 10'. The tubular stationary member 46 is laminated as shown, and is provided with spaced circular slots between the poles 45 containing ring-shaped coils in sets of three, 48, 49 and 50, for three-phase operation. Thus, the skewable stator pole segments 45 are separated by an air gap 51 between the rotor 16 and their opposed faces, and by another air gap 52 between tubular stationary ring 46 and their opposed faces, as indicated. These air gaps and the intervening metallic paths are traversed by flux in accordance with three-phase operation, the values occurring in sequence at poles 48, 49 and 50 linearly of the row of stator poles generally along the axial plane. The operation is otherwise as explained in connection with the preceding drawings, for alternative motor and generator use.

In the shell type rotor dynamo illustrated in Figs. 6 and 7, the outer stator 52 is composed of ring-shaped laminations providing the linear row of poles 53 shown in Fig. 7 and relatively rotatable within shell 54 in planes normal to the axis in order to skew the rows of poles 53. This is accomplished as before by a non-magnetic skewing slat 55 pivoted at its right-hand end in frame 54 and displaced at its left-hand end by a lever 56 connected to a shaft 57 rotatable by crank 58 within stationary tube 59 anchored to frame 54, as shown. Tapped and staggered windings 60 are arranged on the poles 53 in the same way and for the same purpose as described in connection with Figs. 1 and 2.

An inner stator 61, likewise composed of lamination rings of magnetic material encircle stationary tube 59 and are held against endwise displacement but not against relative rotation by end plates 62 secured to tube 59. These laminations are toothed to provide the bars 63 opposite outer stator bars 53, as shown in Fig. 7 and adapted to be skewed with the latter by a slat 64 passing loosely through them and anchored at its right-hand end on a radial extension 65 on tube 59 and displaced at its other end by a lever 66 connected to shaft 57. It will be observed that as shaft 57 is turned by crank 58, outer stator bars 53 and inner stator bars 63 are skewed in the same direction and to the same degree, so that they always lie opposite each other.

Interposed in the annular space between the outer and inner rows of stator bars 53 and 63, is the shell type rotor 67 composed of a large tube of non-magnetic conducting material such as copper, divided into a plurality of axial conductors 68 by slots 69. The rotor 67 is journalled at one end on bearing 70 or tube 59 and at its other end on bearing 71 in frame 54. The extension 72 of rotor 67 is the shaft of the dynamo.

The operation of the embodiment of Figs. 6 and 7 as a motor is substantially the same as that of Figs. 1 and 4, in that the flux bundles move linearly along the opposed rows of inner and outer stator poles 53 and 63, and the rate at which they traverse the rotor bars 68 depends on the angle of skew of the poles 53 and 63 to the axial plane. The rotor conductors 68 are urged to follow the flux bundles in the manner described, thus resulting in rotation of the rotor 67. Generator operation of the embodiment of Figs. 6 and 7 will be readily understood from the foregoing description.

Instead of effecting skewing mechanically as in the preceding embodiments, it may be done electrically. Referring to Fig. 8, which is a schematic development of a stator or rotor, a plurality of rows OV of poles 73 are shown, each having its energizing coil, not shown, but arranged to be connected to the phases A, B and C, as in Fig. 3. As indicated, the pole coils are selectively energized by common switching mechanism, so that diagonal rows $0W_1$, or $0W_2$, or $0W_3$ are effective at will as indicated by the shading. For example, the coils 74 of poles 73 may be connected to corresponding phases by a switch 75, as shown in Fig. 8. Thus if the angle of skew is to be changed from $0W_1$ to $0W_2$, for example, switch 75 is shifted to the corresponding terminals. The simple switching mechanism shown suffices to illustrate the invention, but it will be understood that in actual practice, the switching of all rows of poles parallel to $0W_1$, $0W_2$, etc., will be effected, preferably by a cylinder cam, rotatable step-by-step to switch from one degree of skew to another. Hence effective skewing of the diagonally linear flux bundle path may be accomplished very simply without mechanism other than the external switching mechanism.

Although a preferred embodiment of the invention has been illustrated and described herein, the invention is not limited thereby, but is susceptible of changes in form and detail within the scope of the appended claims.

I claim:

1. In a polyphase alternating current dynamo-electric machine, the combination of a plurality of magnetic poles having their faces disposed in a row, windings for the several poles each adapted to be connected to a corresponding alternating current phase, an elongated conductor, and means mounting said poles and conductor for relative movement of said conductor substantially parallel to itself in a direction at an angle to its length with the row of energized pole faces disposed at an angle to said conductor and spaced therefrom by a substantially uniform air gap.

2. In a polyphase alternating current dynamo electric machine, the combination of a plurality of magnetic poles having their faces disposed in a row, windings for the several poles each adapted to be connected to a corresponding alternating current phase, an elongated conductor, means mounting said poles and conductor for relative movement of said conductor substantially parallel to itself in a direction at an angle to its length with the row of energized pole faces disposed at an angle to said conductor and spaced therefrom by a substantially uniform air gap, and means for adjusting the effective angle between said energized row of pole faces and said conductor.

3. In a polyphase alternating current dynamo electric machine, the combination of a plurality of magnetic poles, windings for the several poles each adapted to be connected to a corresponding alternating current phase, a plurality of parallel elongated conductors of non-magnetic material connected together at their corresponding ends, means mounting said poles and conductors for relative movement of the conductors substantially parallel to themselves in a direction at an angle to their lengths with said plurality of poles disposed at an angle to said conductors and spaced therefrom by a substantially uniform air gap, and means for adjusting the spacing between said respective poles substantially equally over a given range.

4. In a polyphase alternating current motor, the combination of a plurality of magnetic poles having their faces disposed in a row, windings for the several poles each adapted to be connected to a corresponding alternating current phase to cause a concentration of flux to travel along said row in accordance with the energization of the successive windings thereof, an elongated conductor of non-magnetic material, and means mounting said poles and conductor for relative movement of said conductor substantially parallel to itself in a direction at an angle to its length with the row of energized pole faces disposed at an angle to said conductor and spaced therefrom by a substantially uniform air gap, whereby the component of angular movement of said flux concentration along said energized row relatively to said conductor induces across said air gap a current in said conductor causing the latter to move substantially parallel to itself and to the surface of said pole faces.

5. In a polyphase alternating current motor, the combination of a plurality of magnetic poles having their faces disposed in a row, windings for the several poles each adapted to be connected to a corresponding alternating current phase to cause a concentration of flux to travel along said row in accordance with the energization of the successive windings thereof, an elongated conductor of non-magnetic material, means mounting said poles and conductor for relative movement of said conductor substantially parallel to itself in a direction at an angle to its length with the row of energized pole faces disposed at an angle to said conductor and spaced therefrom by a substantially uniform air gap, whereby the component of angular movement of said flux concentration along said energized row relatively to said conductor induces across said air gap a current in said conductor causing the latter to move in a direction substantially parallel to itself and to the surface of said pole faces, and means for adjusting the effective angle between said row of energized pole faces and said conductor.

6. In a polyphase alternating current dynamo electric machine, the combination of a stator, a rotor, a plurality of magnetic poles on said stator having their faces disposed in a row, windings for the several poles each adapted to be connected to a corresponding alternating current phase, a plurality of parallel elongated short-circuited conductors of non-magnetic material mounted on said rotor, and means mounting said poles and conductor for relative movement of said conductors substantially parallel to themselves in a direction at an angle to their lengths and at an angle to the row of energized pole faces and spaced therefrom by a substantially uniform air gap.

7. In a polyphase alternating current dynamo electric machine, the combination of a stator, a rotor, a plurality of magnetic poles on said stator having their faces disposed in a row, windings for the several poles each adapted to be connected to a corresponding alternating current phase, an elongated conductor of non-magnetic material on said rotor, means mounting said conductor for relative movement substantially parallel to itself in a direction at an angle to its length with any point thereon describing a circle in a plane normal to the axis and means mounting said poles with the row of pole faces disposed at an angle to said conductor and spaced therefrom by a substantially uniform air gap, and means on said stator for adjusting the angle of said row of pole faces relatively to the plane of the rotor axis.

8. In a polyphase alternating current dynamo electric machine, the combination of substantially axially disposed rows of magnetic poles separated by a radial space and arranged at an angle to each other, windings for energizing at least part of said rows of poles and severally connected to a corresponding alternating current phase for creating flux across said space, a rotor having a plurality of parallel non-magnetic conductors disposed for rotation in said radial space about an axis and arranged at an angle to each row of poles.

9. In a polyphase alternating current dynamo electric machine, the combination of a stator, a rotor, a plurality of substantially axially disposed rows of magnetic poles on said stator, windings inductively interlinked with the poles of each row and connected to a corresponding alternating current phase, a magnetic core for said rotor, a circular series of parallel non-magnetic conductors arranged substantially longitudinally of the axis on said rotor core and spaced from the stator pole faces by an air gap, and means for skewing each row of poles at an angle to the longitudinal axis of the adjacent rotor conductor.

10. In a polyphase alternating current dynamo electric machine, the combination of a stator, a rotor, a plurality of substantially axially disposed rows of magnetic poles on said stator, said magnetic poles being composed of stacks of relatively movable laminations arranged in planes normal to the stator axis, windings for the several poles of each row each connected to a corresponding alternating current phase, a magnetic core for said rotor, a circular series of parallel non-magnetic conductors arranged substantially parallel to the axial plane on said rotor core and spaced from the stator pole faces by an air gap, and means for skewing each row of poles at an angle to the longitudinal axis of the adjacent rotor conductor.

11. In a polyphase alternating current dynamo electric machine, the combination of a stator frame, a plurality of ring-shaped coils mounted on said frame in axially-spaced relation and each adapted to be connected to a corresponding phase of said polyphase alternating current source, a rotor mounted coaxially within said coils and including a circular series of parallel non-magnetic conductors arranged substantially longitudinally of said axis and spaced radially from said coils, a plurality of substantially axially disposed rows of magnetic poles interposed in the annular space between said rotor conductors and said rings, said poles of each row being opposite corresponding coils for energization thereby, and means for skewing each row of poles at an angle to the longitudinal axis of the adjacent rotor conductor.

12. In a rotary polyphase alternating current dynamo electric machine, the combination of stator and rotor members, a plurality of magnetic poles on one of said members cylindrically around the axis of rotation of said machine and having their poles disposed in rows forming various angles relatively to said axis, windings for the several poles of each row adapted to be connected to a corresponding phase of a polyphase alternating current source, a plurality of parallel conductors on the other member spaced from the faces of said rows of poles by an air gap and arranged in a circular series around said axis, and means interposed between said source and said windings for selectively energizing the same in accordance with the desired angle of pole face row relatively to said axis.

13. In a polyphase alternating current dynamo electric machine, the combination of a stator, a rotor, a plurality of substantially axially disposed rows of magnetic poles on said stator, windings for energizing the several poles of each row connected to a corresponding phase of a polyphase alternating current source, a stationary magnetic core axially spaced from said stator and having a plurality of substantially axially disposed rows of poles opposite said rows of stator poles, a circular series of parallel non-magnetic conductors on said rotor cylindrically arranged in the space between said stator and said core and spaced from each of their pole faces by an air gap, and means for skewing the corresponding opposite rows of poles on said stator and core at an angle to the longitudinal axis of each rotor conductor, whereby the flux concentration moves along said skewed rows of poles relatively to the longitudinal axes of said conductors opposite said poles.

14. In a polyphase alternating current dynamo electric machine, the combination of a stator, a rotor, a plurality of substantially axially disposed rows of magnetic poles, said magnetic poles being composed of stacks of relatively movable laminations arranged in planes normal to the axis of rotation of the machine, windings for the several poles each adapted to be connected to a corresponding phase of a polyphase alternating current source, an axial magnetic core, a circular series of parallel non-magnetic conductors arranged substantially longitudinally of said axis and spaced from the stator pole faces by an air gap, and means for skewing each row of poles at an angle to the longitudinal axis of said conductors, whereby the flux concentration moves along said skewed rows of poles relatively to the longitudinal axes of said conductors opposite said poles.

15. In a polyphase alternating current dynamo electric machine, the combination of a stator, a rotor, a plurality of spaced magnetic poles disposed substantially cylindrically about the axis of rotation of said machine, windings for the several poles each connected to a corresponding alternating current phase, an axial magnetic core, a circular series of parallel non-magnetic conductors arranged substantially longitudinally of said axis and spaced from said pole faces by an air gap, means for selectively energizing poles forming a row disposed at an angle to the longitudinal axis of the corresponding conductors.

16. In a polyphase alternating current dynamo electric machine, the combination of a stator, a rotor, a plurality of magnetic poles arranged at an angle to the axial plane, said magnetic poles being composed of axially spaced groups of aligned radial projections on the peripheries of relatively movable ring-shaped laminations arranged in planes normal to the stator axis, windings for energizing the several poles of each row and adapted to be connected to a corresponding alternating current phase, a magnetic core for said rotor, a circular series of parallel non-magnetic conductors having their lonigtudinal axes arranged on said rotor core at an angle to the adjacent rows of stator poles and spaced therefrom by an air gap, means for adjusting the relative angle between each row of stator poles and the adjacent rotor conductors.

CHARLES E. ELLIS.

REFERENCES CITED

The following references are of record in the file of this patent:

UNITED STATES PATENTS

| Number | Name | Date |
| --- | --- | --- |
| 518,310 | Duncan | Apr. 17, 1894 |
| 1,144,012 | Walton | June 22, 1915 |
| 1,514,474 | Stewart | Nov. 4, 1924 |
| 1,559,920 | Stewart | Nov. 3, 1925 |
| 1,934,766 | Krussmann | Nov. 14, 1933 |

Disclaimer 2,470,767.—*Charles E. Ellis*, Mahwah, N. J. POLYPHASE ALTERNATING CURRENT DYNAMO. Patent dated May 24, 1949. Disclaimer filed Apr. 27, 1950, by the inventor.

Hereby enters this disclaimer to claims 1 to 9, inclusive, of said patent.
[*Official Gazette May 16, 1950.*]